United States Patent [19]
Shichida et al.

[11] 3,904,897

[45] Sept. 9, 1975

[54] PULSE OPERATED SURFACE MOTOR STATOR

[75] Inventors: Hiromichi Shichida; Kiyoshi Tagami; Kenichi Toyoda, all of Tokyo, Japan

[73] Assignees: Fujitsu Limited; Fujitsu Fanuc Limited, both of Tokyo, Japan

[22] Filed: Aug. 31, 1973

[21] Appl. No.: 393,630

[30] Foreign Application Priority Data
Sept. 8, 1972  Japan.................................. 47-90081

[52] U.S. Cl...................................... 310/12; 310/13
[51] Int. Cl.² ........................................ H02K 41/00
[58] Field of Search ............................ 310/12–14, 310/13, 14, 12; 318/8, 38, 135, 687; 346/29

[56] References Cited
UNITED STATES PATENTS

| | | | |
|---|---|---|---|
| 3,268,747 | 8/1966 | Snowoon ..................... | 310/13 |
| 3,273,727 | 9/1966 | Rogers et al. ................ | 310/13 X |
| 3,457,482 | 7/1969 | Sawyer ........................ | 310/13 X |
| 3,656,014 | 4/1972 | Rich ............................ | 310/13 |
| 3,668,443 | 6/1972 | Schwartz ..................... | 310/12 |
| R27,436 | 7/1972 | Swayer ........................ | 310/12 X |

*Primary Examiner*—Mark O. Budd
*Attorney, Agent, or Firm*—Allan Ratner

[57] ABSTRACT

A pulse operated electromagnetic drive system along a plane is referred to as a pulse operated surface motor in the present disclosure. The pulse operated surface motor has a slider having electromagnetically energizable means, and said slider is electromagnetically driven along a surface of a scale, that is a stator. The scale has a plate member made of magnetic material and is provided with a surface in which there are two kinds of rectangular cavities, the length of one type cavities being parallel to a first direction and the length of the other type being parallel to a second direction, perpendicular to the first direction, and both are at respective predetermined intervals. The cavities of the scale define separate magnetic reluctance zones and said slider cooperates electromagnetically with scale teeth operable as pole pieces between adjacent cavities.

4 Claims, 14 Drawing Figures

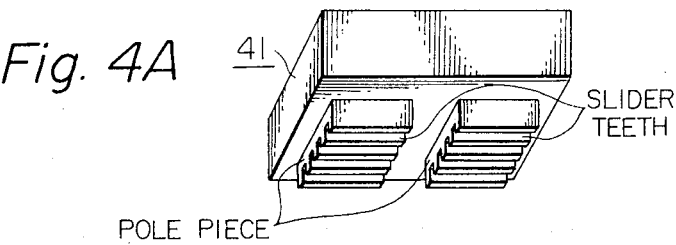
Fig. 4A
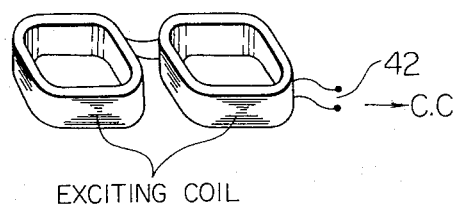
Fig. 4B
Fig. 5
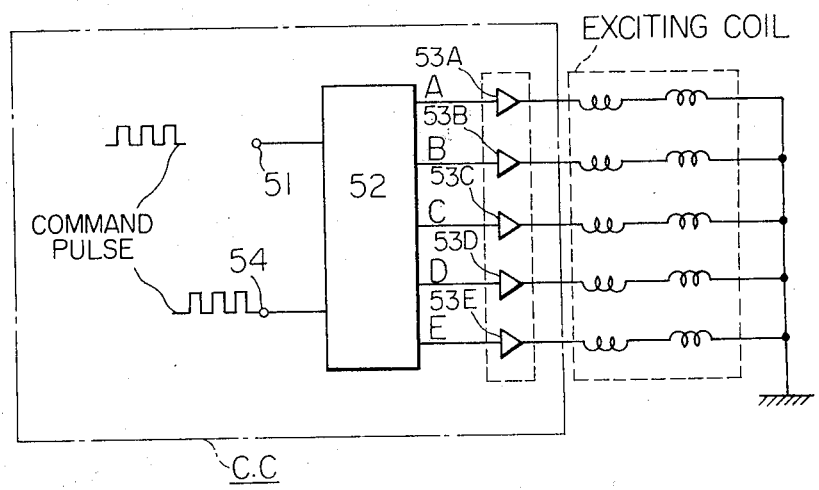

PULSE OPERATED SURFACE MOTOR STATOR

DISCLOSURE OF THE INVENTION

The present invention relates generally to a pulse operated electromagnetic drive system in which a movable elements moves in a plane along a surface of a cooperating plate-like stationary element, and the movement of the movable element is electromagnetically controlled in response to pulse inputs applied from control circuits. The present invention specifically refers to such a drive system as a pulse operated surface motor and also, refers to the movable and the cooperating plate-like stationary elements as a slider and a scale, that is a stator, respectively. Said movable element, that is the slider, can move in one direction on the surface of said scale with fine steps according to the pulses from the control circuit. Usually, a pulse operated surface motor is comprised of a first slider which moves in a first direction, a second slider which rides on the first slider and moves in second direction perpendicular to the first direction and a scale which cooperates electromagnetically with both sliders. Consequently, said second slider can move smoothly to any selected portion on the scale. The moving action of said second slider is very useful when the pulse operated surface motor is utilized in, for example, an automatic manufacturing system which requires fine machining control, without manual operation. It is noted that when such moving action is required, said scale should have two kinds of scales, one of which cooperates electro-magnetically with one slider moving in a first direction and another of which cooperates electromagnetically with another slider moving in a second direction and both existing on the same surface of the stator.

In the prior art, the two kinds of scales are produced, like a grid, by making numerous small square cavities on the surface of the stator at predetermined small intervals in lines parallel to the first direction and in rows parallel to the second direction. In making the numerous small square cavities on a surface, an etching process is more suitable than any other machining process. However, it is difficult to make cavities having the desired configuration when the cavities are very small. Especially, it is very difficult to make the edge portions of the cavities at right angles. As a result, edge portions which should have right angles, are given roundness. The rounded edge portions have a deleterious effect upon electromagnetic coupling between the slider and the scale and accordingly, upon performance characteristic of a pulse operated surface motor.

Therefore, it is a principal object of the present invention to provide a scale of a pulse operated surface motor, which has right angled edge portions and this means that a powerful, uniform moving force is obtained.

The present invention will be more apparent from the ensuing description with reference to the accompany drawings wherein:

FIG. 4A shows detailed construction of a disassembled slider shown in FIG. 1;

FIG. 4B shows a pair of exciting coils separated from the slider shown in FIG. 1;

FIG. 5 is a block diagram of the control circuit according to this invention;

Reference will now be made to FIGS. 1 through 6 in order to provide a general explanation with respect to a pulse operated motor according to the present invention.

Figure 1:
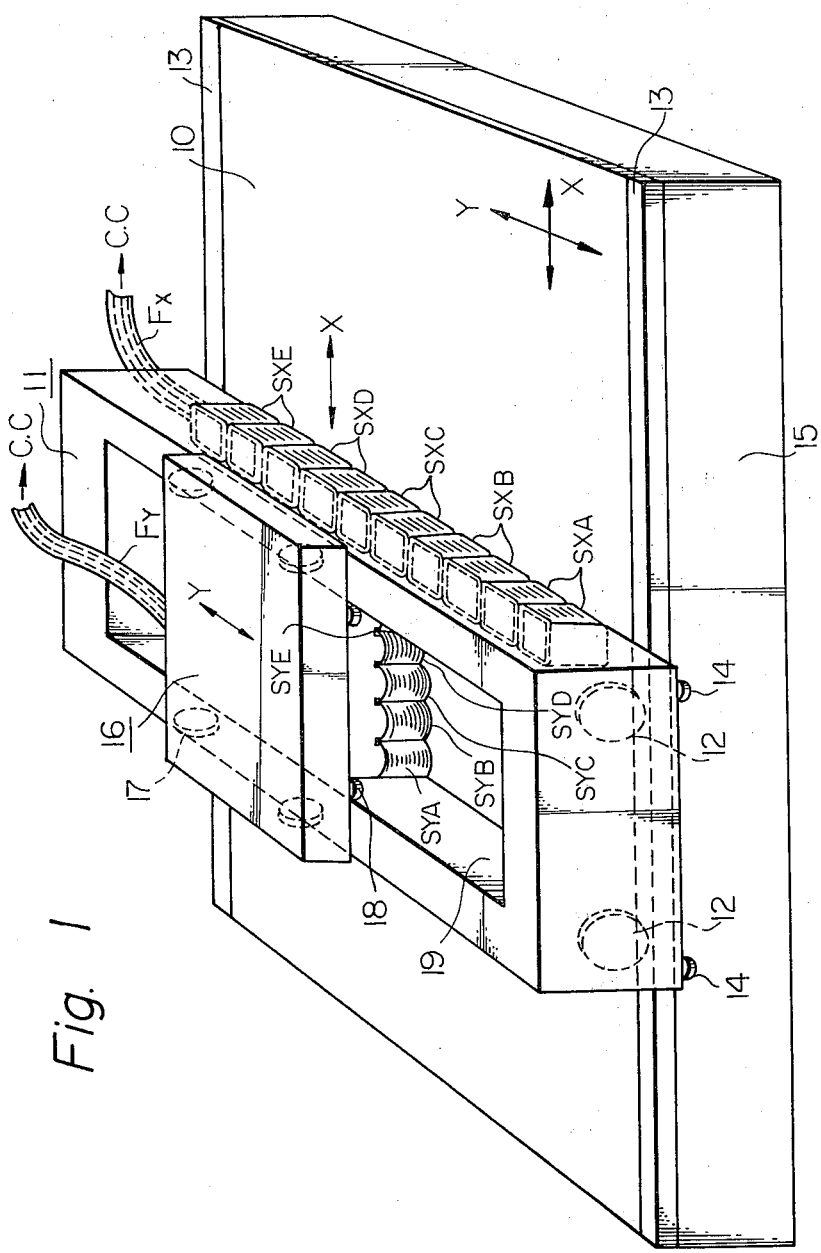
FIG. 1 is a perspective view of a first type of pulse operated surface motor according to this invention.

FIG. 1 is a perspective view of a first type of pulse operated surface motor according to this invention. In FIG. 1, reference numeral 10 designates a stator having a plurality of scale teeth (not shown) made of magnetic material and arranged in the shown X-axis direction and in the shown Y-axis direction, perpendicular to the X-axis by predetermined respective pitches, as described later. The tops of the above-mentioned scale teeth form, as a whole, an even plane.

Reference number 11 indicates a support frame holding X-sliders, SXA, SXB . . . SXE, and is driven along the X-axis direction by the X-sliders. The support frame 11 is provided with rollers 12 rotatable on the rail faces 13, keeping a small vertical gap between the X-sliders and the upper surface of said scale teeth, and guide rollers 14 at four corners rotatable on guide side surfaces 15, so that the support frame may displace to any selected position along the X-axis direction, and be accurately and selectively positioned.

On the support frame 11, the mounting plate 16 is supported so as to be able to move along the Y-axis direction and is driven by the Y-sliders SYA, SYB . . . . SYE. The mounting plate 16 is also provided with rollers 17 rotatable on the top surface of the support frame 11, keeping a small vertical gap between the Y-sliders and the upper surface of said scale teeth, and guide rollers 18 at four corners, rotatable on side surfaces 19, so that the mounting plate may displace to any selected position along the Y-axis direction and be accurately and selectively positioned. Thus, the mounting plate 16 is capable of displacing to any selected position on the surface of the stator 10 by the X and Y-sliders upon being energized by pulse inputs supplied from control circuit C.C (FIG. 5) through feed lines Fx and Fy.

Figure 2:
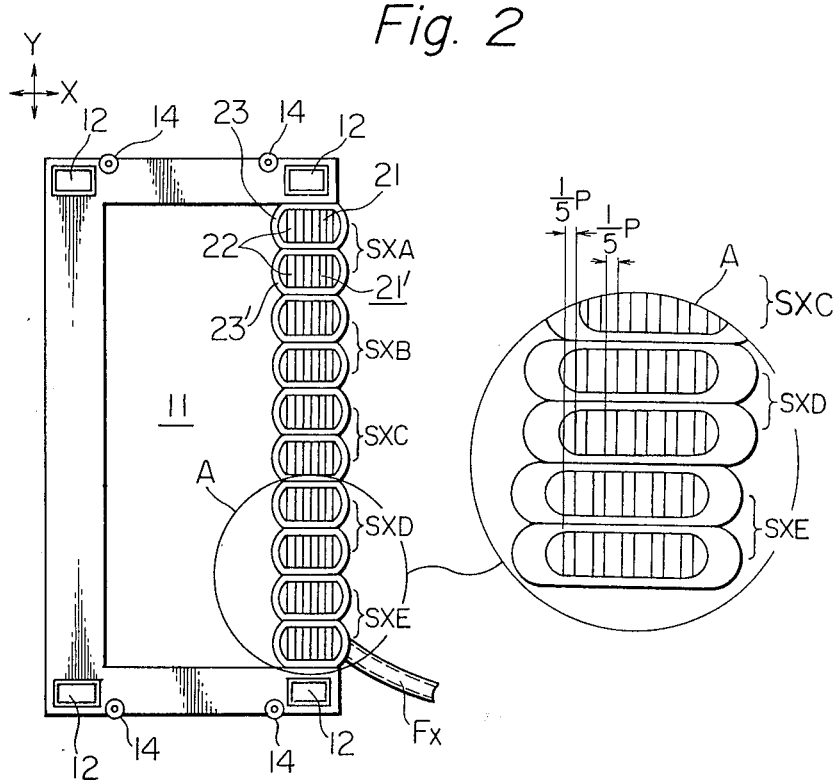
FIG. 2 is a bottom view of the support frame shown in FIG. 1.

FIG. 2 is a bottom view of the support frame 11 seen from the stator 10 in FIG. 1. The support frame 11 holds five pairs of X-sliders SXA, SXB . . . SXE. Each X-slider has one pair of X-slider pole pieces 21 and 21' and the X-slider teeth 22 are attached to the X-slider pole pieces so as to cooperate electromagnetically with said scale teeth.

Each X-slider pole piece is usually provided with two or more X-slider teeth 22. And each pair of X-slider pole pieces is surrounded by one pair of X-exciting coils 23 and 23'.

When a voltage is applied to the terminals of the X-exciting coils, a magnetic path is obtained through X-slider pole pieces, X-slider teeth, air gaps and adjacent scale teeth, then an attractive force occurs between the X-slider teeth and the adjacent scale teeth. This attractive force enables the support frame 11 to be placed in a selected position along the X-axis direction by controlling pulses applied to the X-exciting coils through the feed line Fx.

Figure 3:
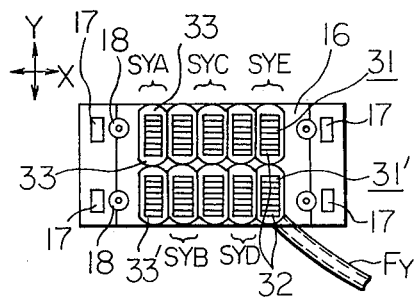
FIG. 3 is a bottom view of the mounting plate shown in FIG. 1.

FIG. 3 is a bottom view of mounting plate 16 seen from stator 10 in FIG. 1. The mounting plate 16 holds five pairs of Y-sliders SYA, SYB . . . SYE. Each Y-slider has one pair of Y-slider pole pieces 31 and 31' and the Y-slider teeth 32 are attached to the Y-slider pole pieces so as to cooperate electromagnetically with said scale teeth. Each Y-slider pole piece is usually provided with two or more Y-slider teeth 32, and is surrounded by one pair of Y-exciting coils 33 and 33'. When a voltage is applied to the terminals of the Y-exciting coils, an attractive force occurs between Y-slider teeth and said scale teeth in the same manner described above. This attractive force enables the mounting plate 16 to be placed in a selected position along the Y-axis direction by controlling pulses applied to the Y-exciting coils through the feed line Fy. Said attractive forces mentioned in the explanations of FIGS. 2 and 3 enable the mounting plate 16 to be placed with high accuracy at any selected position on the surface of the stator 10.

FIG. 4A shows detailed construction of a disassembled X- or Y-slider 41 wherein each pole piece has five slider teeth.

FIG. 4B shows a pair of X- or Y-exciting coils disassembled from the X- or Y-slider. The terminals 42 of the exciting coil are connected to the control circuit C.C. through the feed line Fx or Fy shown in FIG. 1.

FIG. 5 is a block diagram of the control circuit C.C. The X-slider is driven by one control circuit C.C. and the Y-slider is driven by another control circuit C.C. Both control circuits have the same block diagrams shown in FIG. 5. Operation of the control circuit is as follows. Command pulses are applied to exciting controller 52 through the input terminal 51. The exciting controller 52 decides energization orders of the exciting coil of the slider and the outputs from the exciting controller 52 excite the selected exciting coils through amplifier 53A, 53B . . . 53E in accordance with said energization orders. In FIG. 5, each set of two reactance elements connected in series indicates a pair of exciting coils shown in FIG. 4B. When reversed energization orders are required, the command pulses are applied to the terminal 54.

Figure 6A:
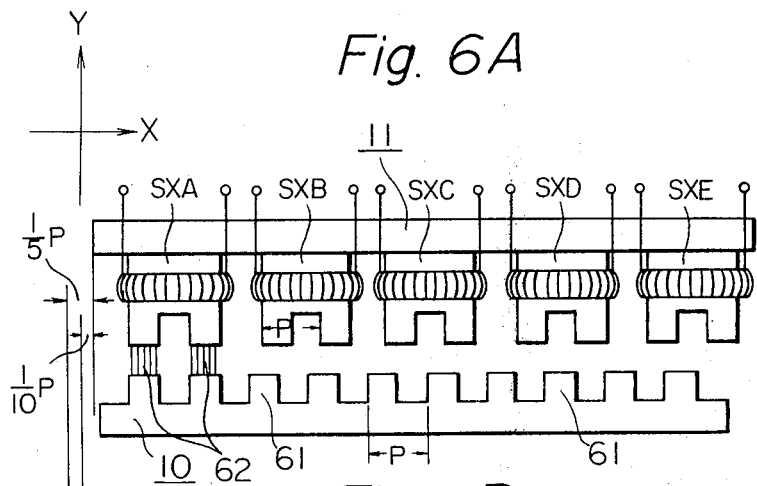
FIGS. 6A, 6B and 6C are enlarged side views showing a principle with respect to a moving action of a typical pulse operated surface motor.
Figure 6B:
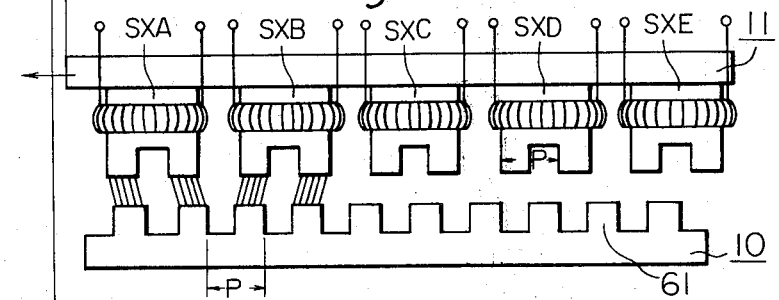
Figure 6C:
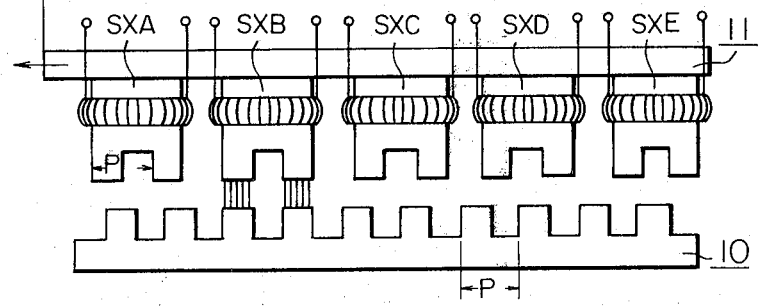

FIGS. 6A, B and C are enlarged views showing a principle with respect to the moving action of support frame 11. In the FIGS. 6A, B and C, each X-slider has only two slider teeth, while each X-slider shown in FIG. 2 and FIG. 4A has five slider teeth, for simplification. Further, the arrangement of X-sliders shown in FIGS. 6A, B and C differs with the arrangement of X-sliders shown in FIG. 2. This modification is also effected to simplify the following explanation of the principle according to this invention. It should be understood that the principle with respect to Y-sliders being held by mounting plate 16 is similar to those shown in FIG. 6A, B and C. In the drawings, reference numeral 61 indicates said scale teeth forming the stator 10. A plurality of the scale teeth 61 are arranged with the same pitch, preferable 1 mm, in the X-axis direction. It should be noted that a plurality of the scale teeth 61 are also arranged with the same pitch, preferable 1 mm, in the Y-axis direction os that the Y-sliders can move along the Y-axis direction. The pair of slider teeth attached to each X-slider is arranged with the same pitch "P", which indicates the width of pitch, preferably 1 mm. The pitch with which the X-sliders is arranged is selected to be (1/5)P (see for example the enlarged partial view surrounded by circle A in FIG. 2) when there are five X-sliders SXA, SXB . . . SXE. If the support frame 11 is driven by three X-slider SXA, SXB, and SXC, said pitch should be selected equal to (1/3)P. Moving action is explained as follows. When amplified command pulses from the output of the control circuit C.C, shown in FIG. 5, are applied to the X-exciting coil attached to the X-slider SXA, an attractive force occurs between the pair of slider teeth of the X-slider SXA and a pair of adjacent scale teeth. This attractive force is pictured by imaginary parallel lines 62 in FIG. 6A. Then X-slider SXA, accordingly the support frame 11, moves to a position where the center portion of slider teeth coincides with the center portion of the adjacent scale teeth 61. Next, two separate amplified command pulses from the output of the control circuit C.C are applied to the X-exciting coil attached to the X-slider SXA and to the X-exciting coil attached to the X-slider SXB. Two attractive forces occur like two groups parallel lines shown in FIG. 6B. Then X-sliders SXA and SXB, accordingly the support frame 11, move to a position where a middle point between the center portions of slider teeth attached to SXA and SXB coincides with a middle point between the center portions of two adjacent scale teeth 61. At this time, one step movement of support frame 11 along the X-axis direction is obtained and the length of the one step corresponds to (1/10)P. If the P is selected to be 1 (mm), one step becomes 0.1 (mm). Next, only the exciting coil attached to the X-slider SXB is energized and the X-slider SXB moves to a position where the center portion of slider teeth of SXB coincides with the center portion of adjacent scale teeth 61. At this time, one step movement, that is (1/10)P, of support frame 11 is obtained in the same manner and is shown in FIG. 6C. Consequently, when the exciting coils attached to the X-sliders SXA, SXB . . . SXE are energized in this order: (SXA), (SXA, SXB), (SXB), (SXB,SXC), (SXC), (SXC, SXD), (SXD), (SXD, SXE), (SXE) and (SXE, SXA), the support frame 11 steps every (1/10)P upon respective energizations along the X-axis direction. It should be noted that the mounting plate 16 also steps every (1/10)P upon respective energization along the Y-axis direction when the Y-sliders are in this order: (SYA), (SYA, SYB), (SYB), (SYB, SYC), (SYC), (SYC, SYD), (SYD), (SYD, SYE), (SYE) and (SYE, SYA). The sequence for energizing the exciting coils is not limited to the above mentioned sequence and orders such as (SXA, SXB), (SXA, SXB, SXC), (SXB, SXC), (SXB, SXC, SXD), (SXC, SXD), (SXC, SXD, SXE), (SXD, SXE), (SXD, SXE, SXA), (SXE, SXA) and (SXE, SXA, SXB) and more preferable in view of increased driving force and reduced vibration in actual operation.

Figure 7:
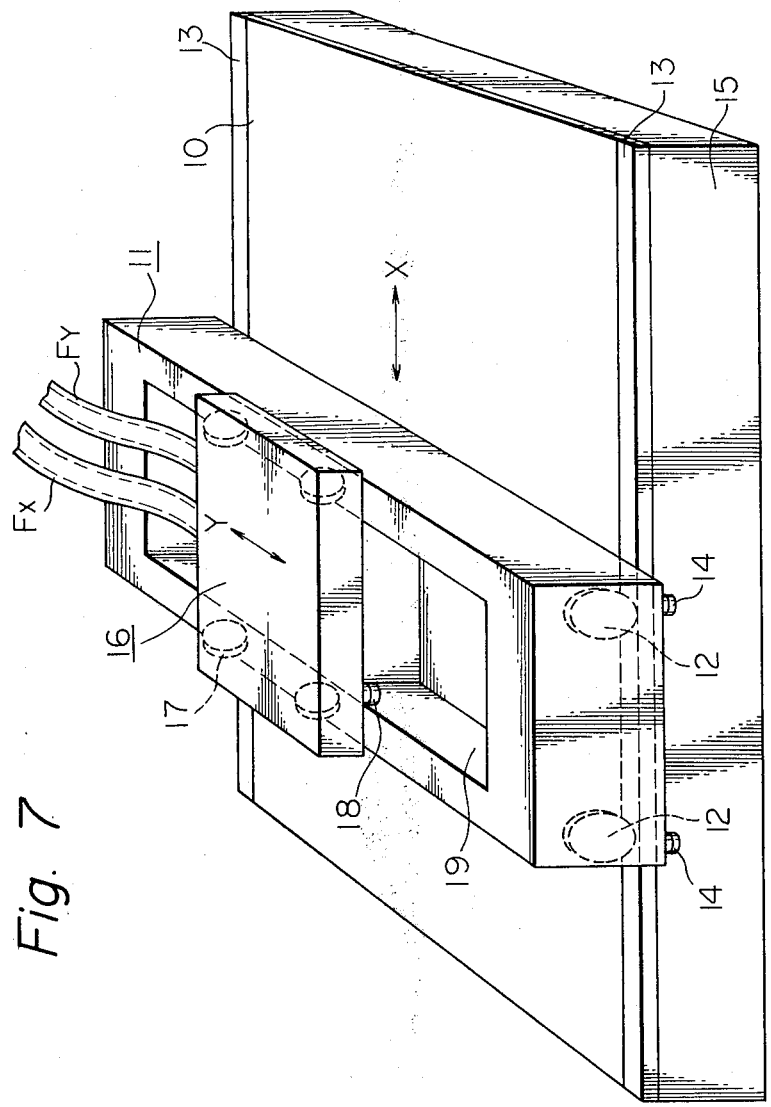
FIG. 7 is a perspective view of a second type of pulse operated surface motor according to this invention.

FIG. 7 is a perspective view of a second type of pulse operated surface motor according to this invention. The difference between the first and the second type of pulse operated surface motor is that the mounting plate 16 of the second type of pulse operated surface motor holds both X-sliders SXA, SXB . . . SXE, and Y-sliders SYA, SYB, . . . SYE as shown in FIG. 7, and the support frame 11 holds no X-sliders. However, the principle with respect to the moving action of the X- and Y-sliders is same as with the first type of pulse operated surface motor in FIG. 1.

Figure 8:
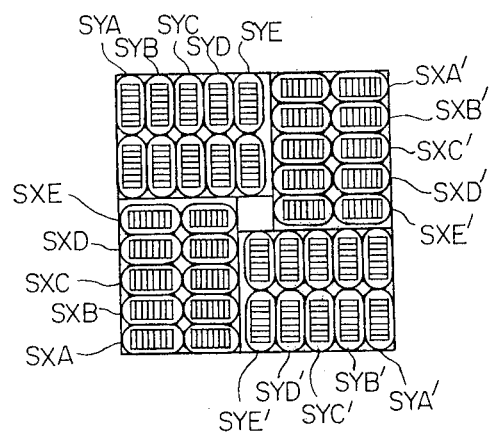
FIG. 8 is one example of a bottom view of the mounting plate shown in FIG. 7.

FIG. 8 is one example of a bottom view of the mounting plate 16 seen from stator 10 in FIG. 7. In FIG. 8, the arrangement of the X- and Y-sliders is the same as in the prior art. This is, as the in the prior art, the X-sliders, SXA and SXA' (also SXB and SXB' . . . SXE and SXE') and the Y-sliders SYA and SYA' (also SYB and SYB' . . . SYE and SYE') are respectively energized at the same time according to the command pulses through the feed lines $F_x$ and $F_y$ shown in FIG. 7.

Figure 9:
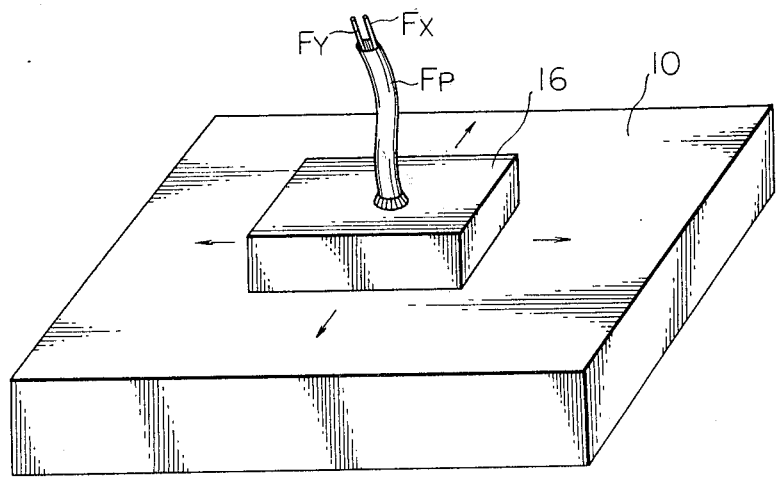
FIG. 9 is a perspective view of a typical pulse operated surface motor of the prior art.

FIG. 9 is a perspective view of a typical pulse operated surface motor of the prior art. In FIG. 9, the mounting plate 16 holds both X-sliders SXA, SXB . . . SXE and Y-sliders SYA, SYB . . . SYE and the arrangement of X- and Y-sliders is same as shown in FIG. 8. Further the mounting plate 16 is not supported by any support element such as support frame 11 shown in FIG. 1 and FIG. 7, but is supported by an air bearing or a fluid bearing. The air flow or the fluid flow provides said air bearing or fluid bearing between the mounting plate 16 and the stator 10, respectively, so as to keep a constant small gap between them. The air flow or the fluid flow is provided through a flexible feed pipe $F_P$ shown in FIG. 9.

Figure 10A:
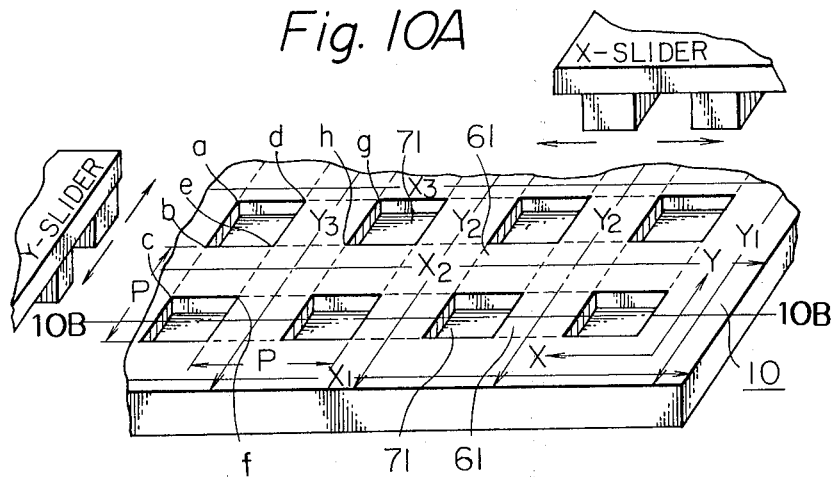
FIG. 10A is an enlarged perspective view of a scale of the prior art.

FIG. 10A is an enlarged perspective view of a typical construction of stator 10 in the prior art. In FIG. 10A, the scale teeth 61 shown in FIGS. 6A, 6B and 6C are formed as a result of the formation of cavities 71. The cavities 71 are arranged in the orthogonal X- and Y-axis directions by a shown equidistant pitch "P". The cavities 71 are formed in respective square shapes and, therefore, sides ab, ad, be and de have the same lengths. As the scale teeth 61 are made of magnetic material, each cavity 71 is able to define a zone in which, when magnetic flux is introduced in the scale teeth 71, the magnetic flux undergoes large magnetic reluctance compared to the area out of the defined zone. The cavities 71 should be filled by nonmagnetic material. However it is not actually necessary to fill the cavities with materials such as glass, resin, aluminum or brass because the air is also a non-magnetic material. It will easily be understood that the cavities 71 may be formed into through-holes, if such are desirable. The X-axis runs right and left, while the Y-axis runs up and down. The square portion shown by "dehg" defines one part of the scale tooth 61 in the case that the X-slider moves in the X-axis direction, and the square portion shown by "bcfe" defines one part of the scale tooth 61 in the case that the Y-slider moves in the Y-axis direction. That is to say, the rows of scale teeth 61 shown by arrows cooperate with slider teeth of the Y-sliders and the rows of scale teeth 61 shown by arrows Y1, Y2, Y3, Y4 . . . cooperate with slider teeth of X-sliders.

Figure 10B:
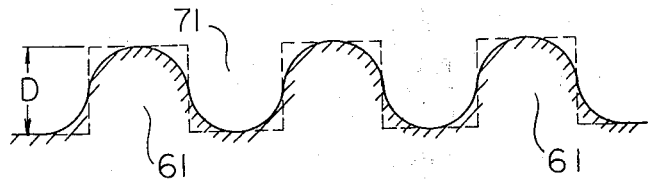
FIG. 10B is a cross sectional view taken along a line 10B — 10B in FIG. 10A.
Figure 11:
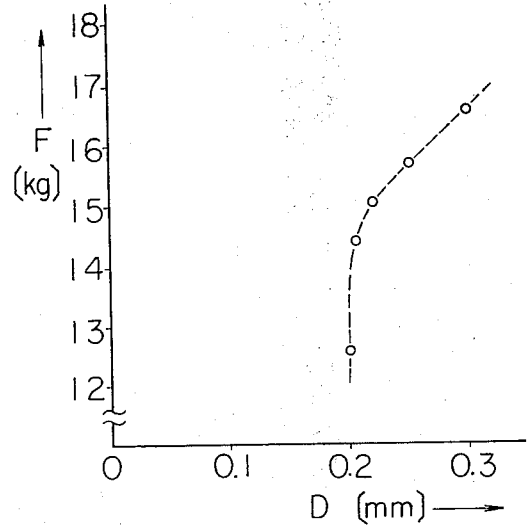
FIG. 11 is one experimental example showing performance characteristics of the prior art.

When numerous cavities 71 are produced on the surface of magnetic material in order to make scale teeth 61 on the surface of the stator 10, such as shown in FIG. 10A, it is evident that an etching process is more suitable to produce such cavities than a machining process. However, it is very difficult to produce such cavities according to a desired configuration, because areas which are to be etched are very small. As a result, an etched configuration as shown in FIG. 10B is produced. FIG. 10B is an enlarged cross sectional view taken along the line 10B — 10B in FIG. 10A wherein dotted lines indicate the desired configuration. As can be seen in FIG. 10B, shoulder portions do not become right angles but are rounded, and base portions also do not become right angles but are rounded because of the adhesion of impurities during the process. These roundnesses on scale teeth 61 have a deleterious effect upon the magnetic coupling between the scale teeth 61 and the slider pole pieces. One of the hindrances is a lowering of the attractive force which occurs between scale teeth and slider teeth and the other is that support frame 11 and mounting plate 16 can not move with highly accurate stepping. Maximum attractive force and highly accurate stepping can be obtained when the scale teeth are etched to conform to the configuration shown by dotted lines in FIG. 10B. The worst effect occurs when in producing the stator 10, it is necessary to grind the top surface of the stator 10 after the etching process in order to make the top surface a perfect plane. So the depth D (see FIG. 10B) between top and bottom of the stator teeth 61 varies in proportion to the amount of said grind. Consequently, the attractive force between the scale teeth and the slider teeth varies according to a variation of the depth D. FIG. 11 is one experimental example showing the relation between the attractive force and the depth D. Wherein F indicates restraining force in Kg which is considered to represent a value of said attractive force, and D is indicated by mm. The restraining force F is measured by a force applied to the energized slider from a horizontal direction when the slider begins to move. Referring to FIG. 11, it is recognized that the relation indicated by the dotted curve has a sharp differential coefficient, and it is also recognized that it is difficult to produce a pulse-operated surface motor having a powerful, and uniform restraining force and accordingly, a powerful, uniform driving force, because the depth D has a wide range of variation in the grinding process. The worst effect, as mentioned above, is considered to come from the roundness which occurs on the edge portions of the scale teeth.

Figure 12:
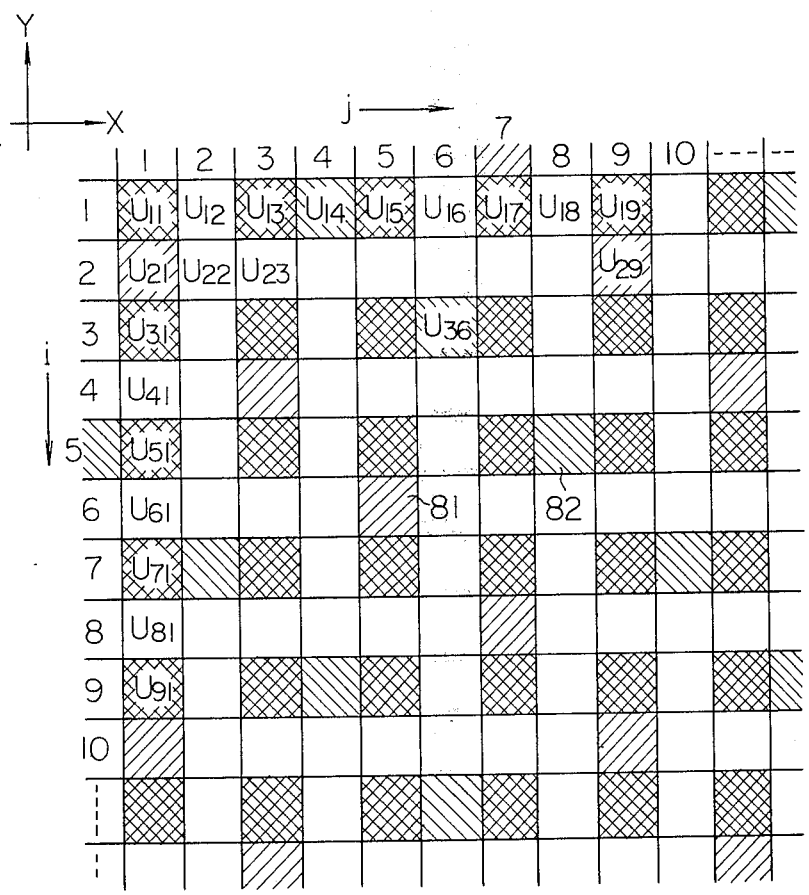
FIG. 12 is a schematic view illustrating an arrangement of a scale tooth according to this invention.

FIG. 12 is a schematic view illustrating an arrangement of scale teeth according to this invention. In FIG. 12, the top surface of the stator is supposed to be an assembly of units which is divided into steps along the $j$-range and steps along the $i$-line. In the drawing, double hatched units, that is the units expressed by $U_{i, (2j-1)}$ and $U_{(2i-1), j}$ where $i = 1, 2, 3, \ldots$ and $j = 1, 2, 3 \ldots$, correspond to the area of the cavities 71 in the prior art shown in FIG. 10A. It should be understood the areas which are expressed by ($U_{1,2}, U_{2,2}, U_{3,2}, U_{4,2} \ldots$ $U_{i,2}$), ($U_{1,4}$, $U_{2,4}$, $U_{3,4}$ ... $U_{i,4}$) ... ($U_{1,k}$, $U_{2,k}$, $U_{3,k}$ ... $U_{i,k}$) where $k = 2, 4, 6$ ... correspond to the scale teeth which cooperate electromagnetically with the slider teeth of X-sliders, and the areas which are expressed by ($U_{2,1}$, $U_{2,2}$, $U_{2,3}$ ... $U_{2,j}$), ($U_{4,1}$, $U_{4,2}$, $U_{4,3}$ ... $U_{4,j}$) ... ($U_{l,1}$, $U_{l,2}$, $U_{l,3}$ ..., $U_{l,j}$) where $l = 2, 4, 6$ ..., correspond to the scale teeth which cooperate electromagnetically with the slider teeth of Y-sliders.

The cavities indicated by cross hatching area produced by the etching process, and are very small, usually 1 mm = 1 mm, as previously mentioned. The roundness on edge portions of scale teeth is caused by the fact that cavities are too small and this roundness has a deleterious effect upon the magnetic coupling between the scale teeth and slider teeth, also previously mentioned. According to this invention, other cavities are added between said cavities indicated by cross hatching in FIG. 11 by hatching from left to right and from right to left. Those hatchings from left to right, that is, ($U_{1,4}$), ($U_{3,6}$), ($U_{5,8}$), ($U_{7,2}$), ($U_{7,10}$), ($U_{9,4}$) ..., designate the scale teeth cooperating with slider teeth of the X-slider at fixed intervals. Other cavities indicated by hatching from right to left, that is, ($U_{2,1}$), ($U_{2,9}$), ($U_{4,3}$), ($U_{4,11}$), ($U_{6,5}$), ($U_{8,7}$), ($U_{10,1}$), ($U_{10,9}$) ..., designate the scale teeth cooperating with the slider teeth of the Y-slider at fixed intervals. Hence, two kinds of cavities 81 and 82 are obtained.

Figure 13A:
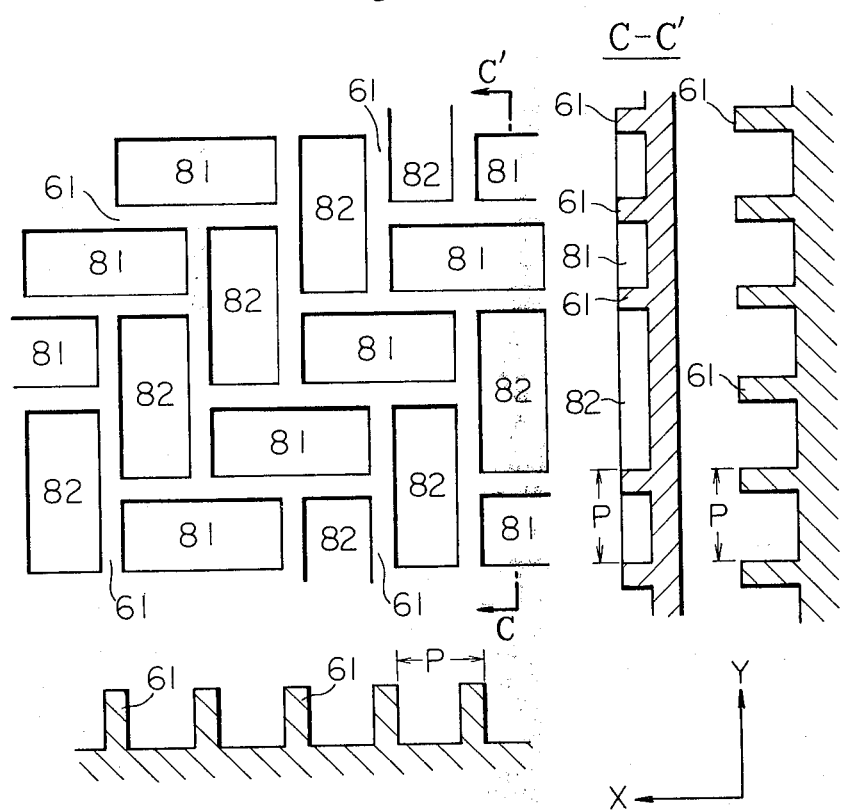
FIG. 13A shows a concrete plane view and cross sectional view in accordance with the schematic view in FIG. 12.
Figure 13B:
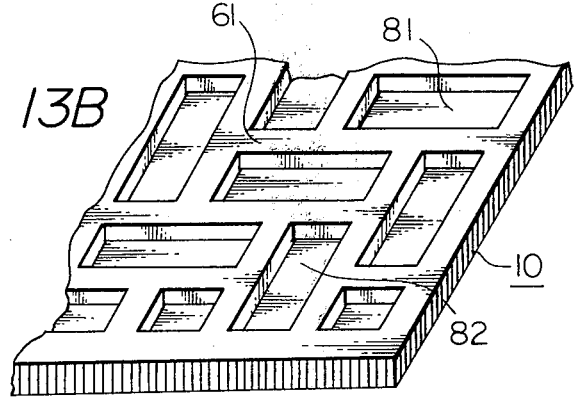
FIG. 13B is a partial perspective view according to this invention.

FIG. 13A will assist further understanding with regard to said cavities wherein the length of the rectangle formed by each cavity 81 is parallel to the X-axis direction and the length of the rectangle formed by each cavity 82 is parallel to the Y-axis direction, and these two kinds of cavities are caught in the scale teeth 61. FIG. 13B is a partial perspective view in accordance with FIG. 13A. It should be remarked that the area of cavities 81 and 82 is three times larger than that of the cavities in the prior art although the pitch "P" of scale teeth 61 is not increased. It is of course, that the pitch "P" of X- and Y-slider teeth coincide with the pitch "P" mentioned above.

It is apparent in etching art that the more the area of the cavity is enlarged, the easier it is to obtain accurate configuration according to design. The configuration shown by hatched sectional view taken along line C–C' in FIG. 13A shows that there is no roundness on each shoulder and base of scale teeth 61 compared to that of in FIG. 10B in the prior art. In FIG. 10B the desired configuration in which the edge portions of said shoulders and bases have right angles, corresponds to the configuration shown by the dotted line. In such a configuration, a powerful, uniform restraining force F is obtained though the scale teeth are partially cut down in order to make such cavities as illustrated by hatchings from left to right and from right to left. Further, said restraining force F has a small range of variation in spite of the wide variation of the depth "D" which occurs in the grind process.

Figure 14:
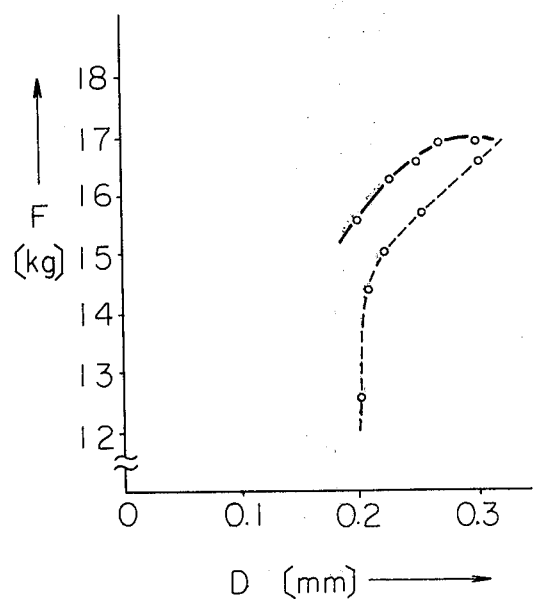
FIG. 14 is one experimental example showing performance characteristics according to this invention compared with that of the prior art.

FIG. 14 is one experimental example showing the relation between the restraining force F and the depth "D" using the stator according to this invention and the usual slider which was used in the experiment for describing performance characteristics shown in FIG. 11. In FIG. 14, the solid line curve indicates performance characteristics according to this invention, and the dotted line curve indicates performance characteristics in the prior art which is equal to the curve shown in FIG. 11. Referring to FIG. 14, the definite advantage according to this invention is obvious. Thus, it will be understood that according to this invention, a pulse operated surface motor provides an increased and uniform driving force regardless of the variation of the depth "D" created by the grinding process, compared to the prior art surface motor and, as a result, the stator of the surface motor which provides a powerful, uniform driving force can be produced by the usual etching process.

When the surface of the stator 10 has a shape such as shown in FIG. 13A, the advantage of the present invention can be obtained if the construction of the X- and Y-sliders is as shown in FIG. 2, 3, or 8. Of course the said advantage can also be obtained if the construction of the X- and Y-sliders is similar to that shown in FIG. 2, 3 or 8.

What is claimed is:
1. A pulse operated surface motor comprising:
   a stator having magnetic and non-magnetic materials arranged at predetermined intervals in first and second directions perpendicular to each other on a surface of the stator, the magnetic materials forming first stator teeth and second stator teeth, both acting as pole pieces, and being arranged in said first and second directions respectively;
   a movable body, located above the surface of said stator which is able to move both in said first and second directions, said movable body including a first slider made of magnetic material having first slider teeth cooperating electromagnetically with said first stator teeth which causes said movable body to move along said second direction, a second slider made of magnetic material having second slider teeth, cooperating electromagnetically with said second stator teeth which causes said movable body to move along said first direction;
   said stator having first and second rectangular shaped non-magnetic materials, said first rectangular shaped non-magnetic materials arranged so that their lengths are parallel to said first direction;
   said second rectangular shaped non-magnetic materials arranged so that their lengths are parallel to said second direction and each of said first stator teeth being formed between adjacent pairs of first rectangular shaped non-magnetic materials and each of said second stator teeth being formed between adjacent pairs of second rectangular shaped non-magnetic materials, in the first direction each first rectangular shaped non-magnetic material overlapping the next first rectangular shaped non-magnetic material in the first direction, and in the second direction each second rectangular shaped non-magnetic material overlapping the next second rectangular shaped non-magnetic material in the second direction.

2. A pulse operated surface motor as set forth in claim 1, wherein said non-magnetic material of said stator consists of cavities.

3. A pulse operated surface motor as set forth in claim 2, wherein said cavities are through-holes.

4. A pulse operated surface motor comprising:
   a stator having magnetic and non-magnetic materials arranged at predetermined intervals in first and second directions perpendicular to each other on a surface of the stator, the magnetic materials forming first stator teeth and second stator teeth, both acting as pole pieces, and being arranged in said first and second directions respectively;

a movable body, located above the surface of said stator which is able to move both in said first and second directions, said movable body including a first slider made of magnetic material having first slider teeth cooperating electromagnetically with said first stator teeth which causes said movable body to move along said second direction, a second slider made of magnetic material having second slider teeth, cooperating electromagnetically with said second stator teeth which causes said movable body to move along said first direction;

said stator having first and second rectangular shaped non-magnetic materials, said first rectangular shaped non-magnetic materials arranged so that their lengths are parallel to said first direction; said second rectangular shaped non-magnetic materials arranged so that their lengths are parallel to the second direction and each of said first stator teeth being formed between adjacent pairs of first rectangular shaped non-magnetic materials and each of said second stator teeth being formed between adjacent pairs of second rectangular shaped non-magnetic materials, an axis passing through the geometric center of each of said first rectangular shaped non-magnetic materials making an angle of substantially 45° with an axis in said first direction, and an axis passing through the geometric center of each of said second rectangular shaped non-magnetic materials making an angle of substantially 45° with an axis in said second direction.

* * * * *